United States Patent
Chaudry et al.

(10) Patent No.: US 11,861,644 B2
(45) Date of Patent: Jan. 2, 2024

(54) NON-TRANSITORY PROCESSOR-READABLE MEDIUMS FOR AUTOMATIC PRODUCT CATEGORY DETECTION USING MULTIPLE MACHINE LEARNING TECHNIQUES

(71) Applicant: Mulberry Technology Inc., New York, NY (US)

(72) Inventors: Ali Chaudry, Astoria, NY (US); Antoine Bachet, Brooklyn, NY (US)

(73) Assignee: Mulberry Technology Inc., New York, NY (US)

( * ) Notice: Subject to any disclaimer, the term of this patent is extended or adjusted under 35 U.S.C. 154(b) by 0 days.

(21) Appl. No.: 17/878,668

(22) Filed: Aug. 1, 2022

(65) Prior Publication Data

US 2023/0034495 A1 Feb. 2, 2023

Related U.S. Application Data

(60) Provisional application No. 63/228,500, filed on Aug. 2, 2021.

(51) Int. Cl.
*G06Q 30/00* (2023.01)
*G06Q 30/0207* (2023.01)
(Continued)

(52) U.S. Cl.
CPC ..... *G06Q 30/0222* (2013.01); *G06Q 30/0283* (2013.01); *G06Q 30/0631* (2013.01); *G06Q 30/0643* (2013.01); *G06V 10/764* (2022.01)

(58) Field of Classification Search
CPC ... G06Q 30/0601–0645; G06Q 30/012; G06Q 30/016
(Continued)

(56) References Cited

U.S. PATENT DOCUMENTS

| | | | |
|---|---|---|---|
| 2009/0119160 A1* | 5/2009 | Woda | G06Q 30/0225 705/14.1 |
| 2010/0153187 A1* | 6/2010 | Ghani | G06Q 30/0631 705/14.53 |

(Continued)

OTHER PUBLICATIONS

Murthy, D. N. P., and Istiana Djamaludin. "New product warranty: A literature review." International Journal of Production Economics 79.3 (2002): 231-260. (Year: 2002).*

(Continued)

*Primary Examiner* — Michael Misiaszek
*Assistant Examiner* — Kennedy Gibson-Wynn
(74) *Attorney, Agent, or Firm* — COOLEY LLP

(57) ABSTRACT

Some embodiments described herein relate to a computer-implemented method that includes receiving an indication of text content and an indication of image content appearing on a webpage that offers a product for sale. A first trained machine learning classifier can be applied to the text content to produce a first classification of the product. A second trained machine learning classifier can be applied to the image content to produce a second classification. A trained combination machine learning classifier can be applied to the first classification and the second classification. The combination machine learning classifier can be configured to predict a third class of the product. A warranty can be defined and/or offered based on the third class of the product.

15 Claims, 6 Drawing Sheets

(51) Int. Cl.
*G06V 10/764* (2022.01)
*G06Q 30/0601* (2023.01)
*G06Q 30/0283* (2023.01)

(58) Field of Classification Search
USPC .............................................. 705/26.1–27.2
See application file for complete search history.

(56) References Cited

U.S. PATENT DOCUMENTS

| | | | | |
|---|---|---|---|---|
| 2020/0034668 | A1* | 1/2020 | Dutta | G06N 20/20 |
| 2020/0285964 | A1* | 9/2020 | Cao | G06F 18/217 |
| 2021/0233102 | A1* | 7/2021 | DeDeo | G06Q 30/0211 |
| 2021/0366023 | A1* | 11/2021 | Maldonado | G06Q 30/0631 |
| 2021/0398183 | A1* | 12/2021 | Jain | G06Q 30/0629 |
| 2022/0300550 | A1* | 9/2022 | Bjornsson | G06Q 30/0643 |

OTHER PUBLICATIONS

Zahavy, Tom, et al. "Is a picture worth a thousand words? A deep multi-modal architecture for product classification in e-commerce." Proceedings of the AAAI Conference on Artificial Intelligence. vol. 32. No. 1. 2018. (Year: 2018).*

Summaira, Jabeen, et al. "Recent advances and trends in multimodal deep learning: a review." arXiv preprint arXiv:2105.11087 (2021). (Year: 2021).*

* cited by examiner

NON-TRANSITORY PROCESSOR-READABLE MEDIUMS FOR AUTOMATIC PRODUCT CATEGORY DETECTION USING MULTIPLE MACHINE LEARNING TECHNIQUES

CROSS REFERENCE TO RELATED APPLICATION

This application is a non-provisional of and claims priority to U.S. Provisional Patent Application No. 63/228,500, filed Aug. 2, 2021, the disclosure of which is hereby incorporated by reference in its entirety.

BACKGROUND

Historically extended warranties on consumer goods been distributed via retailers' sales flow. For example, when a consumer purchases an item from retailers such as Walmart and Best Buy, the retailer has an opportunity to upsell an extended warranty. In such known models for offering extended warranties, retailers typically retain 60-70% of the extended warranty prices, resulting in the final price consumers pay for the extended warranty plan being substantially inflated.

Currently, warrantors are bound to this inefficient model, because identifying appropriate warranties and warranty prices is performed manually, with one or more suitable warranties identified for each product individually selected on, for example, a stock keeping unit (SKU)-by-SKU basis. A need therefore exists to decouple the ability to offer appropriate extended warranties for products in an automated fashion, including on products that have not been manually reviewed for warrantability.

SUMMARY

Some embodiments described herein relate to the use of machine learning (ML) technology that enables the selection and offering of appropriate warranty plans without needing to manually map the retailer's catalogue to warranties.

Some embodiments described herein relate to a computer-implemented method that includes receiving an indication that a user has accessed a webpage. Multiple types of data, such as a universal resource locator (URL), a page or product title, descriptive text, image(s), price, category, etc. can be ingested from the webpage. A first trained machine learning classifier can be applied to a first type of data and a second trained machine learning classifier can be applied to a second type of data. For example, a text classifier trained on descriptive text can be applied to descriptive text, and an image classifier trained on product images can be applied to image data. Each of the first trained machine learning classifier and the second trained machine learning classifier can be configured to return a classification of a product associated with (e.g., offered for sale on) the webpage. A trained combination machine learning classifier can be applied to the classifications returned by the first trained machine learning classifier and the second trained machine learning classifier. The trained combination machine learning classifier can be configured to predict a class of the product. A warranty can be defined and/or offered based on the class of the product predicted by the trained combination machine learning classifier.

Some embodiments described herein relate to a computer-implemented method that includes receiving an indication of text content and an indication of image content appearing on a webpage that offers a product for sale. A first trained machine learning classifier can be applied to the text content to produce a first classification of the product. A second trained machine learning classifier can be applied to the image content to produce a second classification. A trained combination machine learning classifier can be applied to the first classification and the second classification. The combination machine learning classifier can be configured to predict a third class of the product. A warranty can be defined and/or offered based on the third class of the product.

Embodiments described herein also allow for warranty plans to be offered directly to the online shopping consumers, without having a partnership with retailers, resulting in significantly reduced prices.

Some embodiments described herein make use of a browser extension, (e.g., an extension or plug-in to the Chrome®, Firefox® or Edge® web browsers) that allows warranty offers to be made directly to the consumers as they are shopping online, without the need for a partnership with individual retailers.

Some embodiments described herein relate to code (e.g., a browser plug-in) stored in memory and configured to be executed by a processor to receive an indication when a user has accessed a webpage that is hosted by a first server. The code can cause the processor to send, to a second server, data associated with the webpage. In response, an indication of a warranty offer for a product associated with (e.g., offered for sale on) the webpage can be received from the second server. The code can cause a composite webpage that includes at least a portion of the webpage and the warranty offer such that a user viewing the composite webpage can purchase the product from the first server and the warranty from the second server.

DETAILED DESCRIPTION

Figure 1:
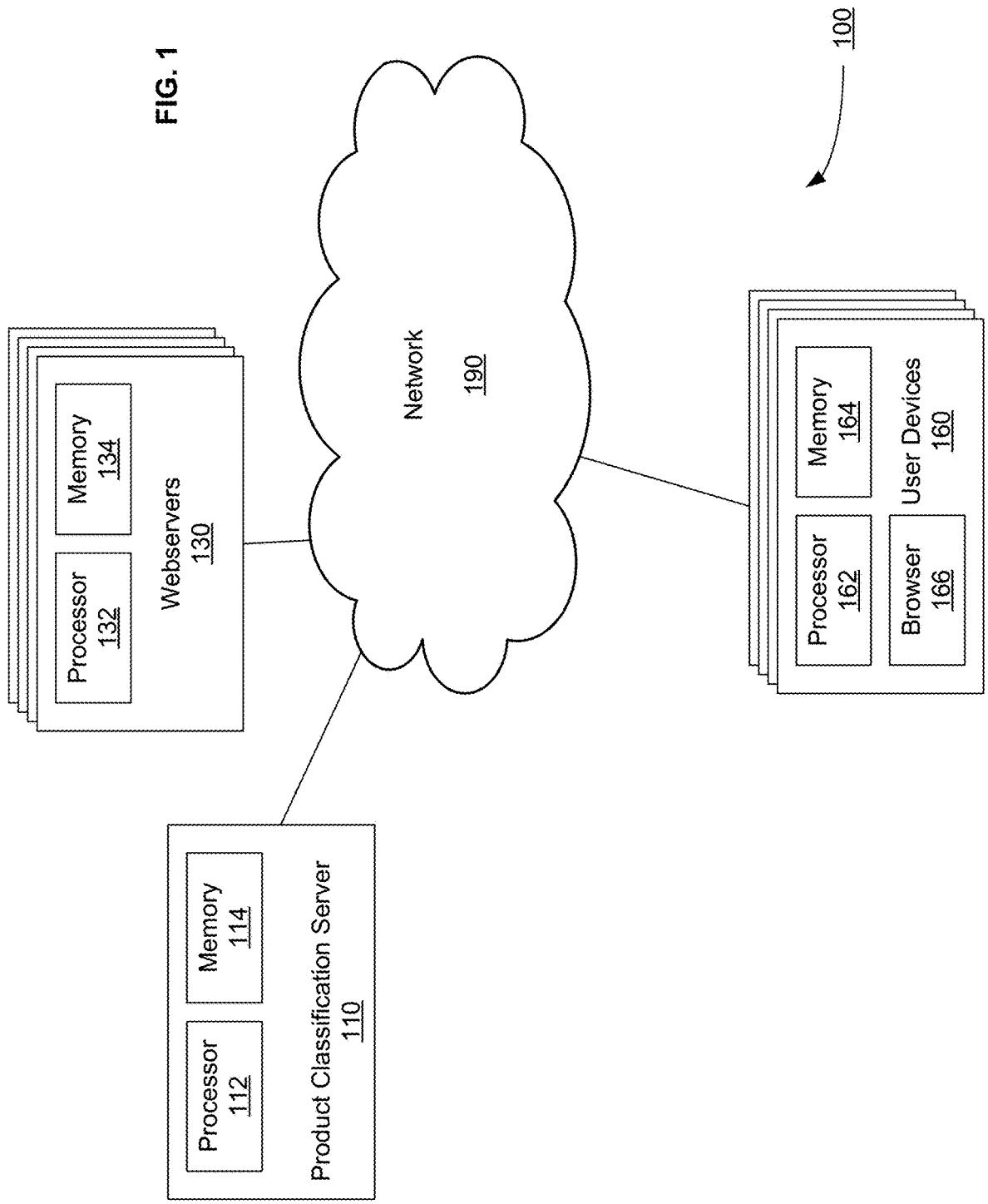
FIG. 1 depicts a schematic illustration of a system that includes a product classification server, according to an embodiment.

FIG. 1 depicts a schematic illustration of an embodiment of a system 100 that includes one or more webservers 130, one or more user device 160, and a product classification server 110, each communicatively coupled via a network. The network 190 can be the internet, an intranet, a local area network (LAN), a wide area network (WAN), a virtual network, a telecommunications network, any other suitable communication system and/or combination of such networks. The network 190 can be implemented as a wired and/or wireless network.

The user devices 160 are computing entities, such as personal computers, laptops, tablets, smartphones, or the like, each having a processor 162 and a memory 164. The processor 162 can be, for example, a general purpose processor, a Field Programmable Gate Array (FPGA), an Application Specific Integrated Circuit (ASIC), a Digital Signal Processor (DSP), and/or the like. The processor 162 can be configured to retrieve data from and/or write data to memory, e.g., the memory 164, which can be, for example, random access memory (RAM), memory buffers, hard drives, databases, erasable programmable read only memory (EPROMs), electrically erasable programmable read only memory (EEPROMs), read only memory (ROM), flash memory, hard disks, floppy disks, cloud storage, and/or so forth.

Each user device 160 can include a browser 166 (e.g., stored in memory 164 and configured to be executed by processor 162). Each user device 160 can be operable to access one or more of the webservers 130, for example via the browser 166. The webservers 130 can be computing entities each having a processor 132 and a memory 134, which can be structurally and/or functionally similar to the processors 162 and/or 164, respectively, discussed above. For example, a user operating a user device 160 to browse the internet (e.g., the network 190) can access webpages stored on one or more of the webservers 130. Additionally, each user device 160 can include a browser plug-in (e.g., code stored in memory 164 and configured to be executed by the processor 162 with the browser 166). As discussed in more detail herein, the browser plug-in can be operable to operable to obtain data from webpages hosted by a webserver 130 and accessed via the browser 166. The browser plug-in can also be operable to communicate with product classification server 110 and composite data received from the product classification server 110 with webpages hosted by webserver 130 such that a user viewing a composite webpage can purchase a product from the webserver 130 and an associated service, such as a warranty from the product classification server 110, for example without being redirected away from the webpage featuring the product and/or to a webpage dedicated to the associated service.

The product classification server 110 can be a computing entity operable to receive data associated with webpages viewed via browser 166, classify products associated with such webpages, and/or send data associated with services associated with said products (e.g., warranties) to the user device 160 for display via browser 166. The product classification server 120 includes a processor 112 and a memory 114, which can be structurally and/or functionally similar to the processor 162 and/or memory 164, respectively, discussed above. In some embodiments memory 114 can store one or more machine learning classifiers configured to be executed by processor 112 to identify a category of a product associated with (e.g., offered for sale by) webserver 130. As discussed in further detail below, in some embodiments it may be particularly advantageous for the memory 114 to store at least three machine learning classifiers. At least two machine learning classifiers can be trained to classify products using different data types. A third machine learning classifier, sometimes referred to herein as a combination machine learning classifier, can be trained to accept, as input, the outputs of the at least two machine learning classifiers trained to classify products directly and return, as output, a final classification. In this way, the combination machine learning classifier can be operable to predict to which class an arbitrary or unknown product belongs. In some instances, the combination machine learning classifier can be operable to identify the class of products that did not exist at the time the classifiers were trained. The product classification server 110 can be configured to define and/or offer an associated service (e.g., a warranty) to a user of the user device 160 based on the final classification. As discussed in further detail herein, the use of multiple machine learning classifiers to process different data types associated with webpages in combination with a combination machine learning classifier to synthesize the outputs of such different machine learning classifiers can produce more accurate classifications than known techniques.

Figure 2:
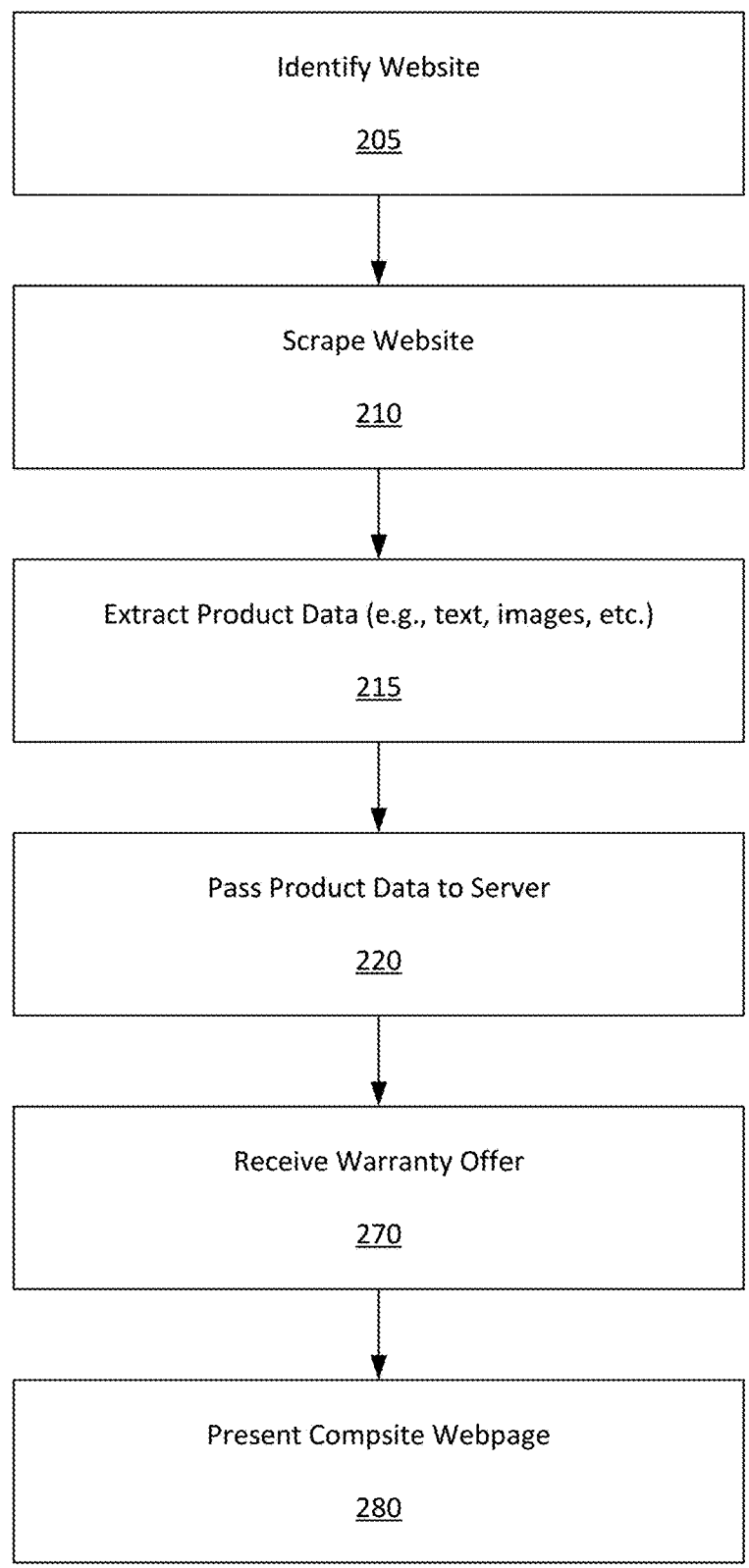
FIGS. 2 and 3 depict various interrelated portions of a flow chart for automatically selecting an appropriate warranty for a product, according to an embodiment.
Figure 3:
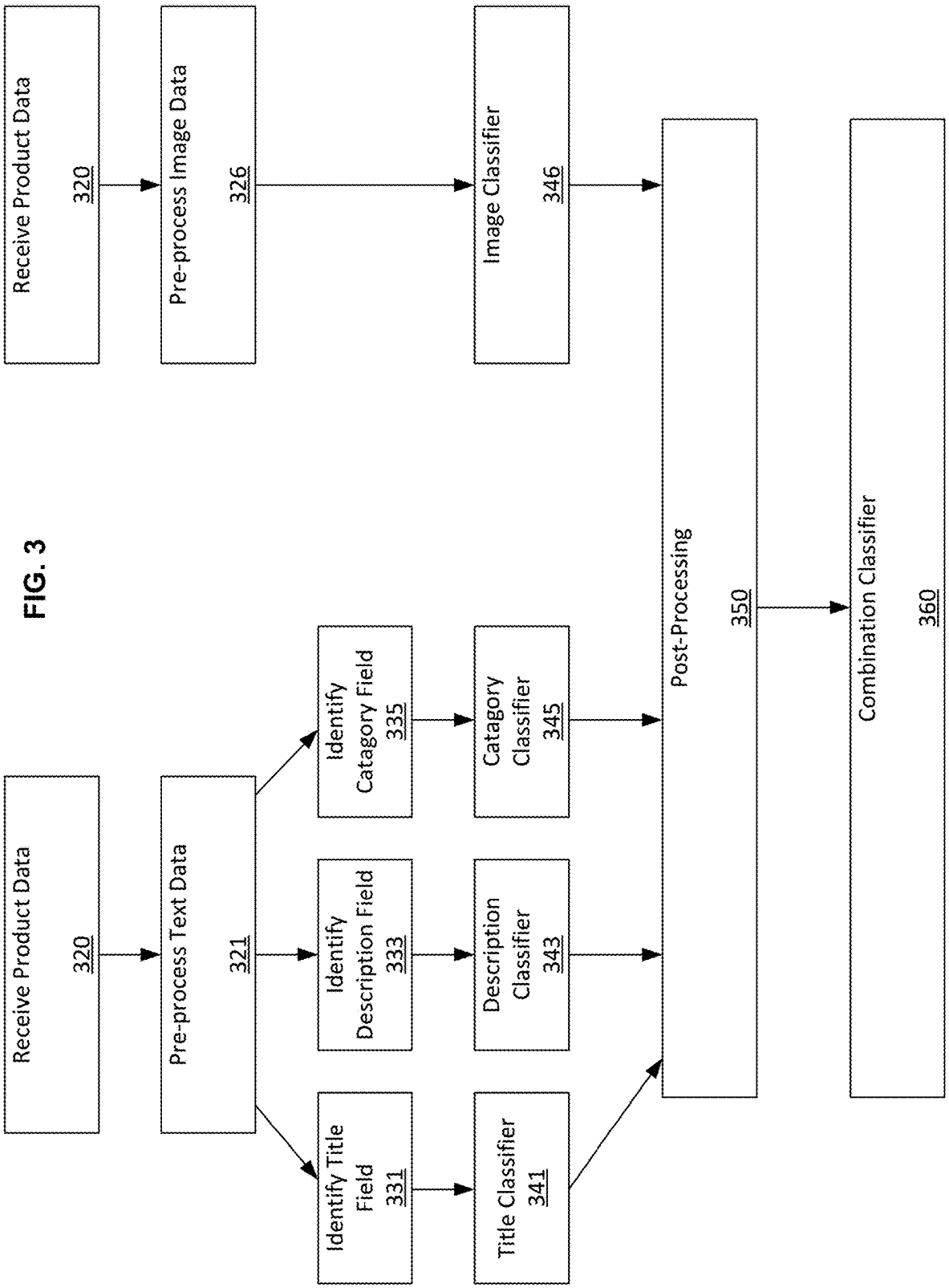

FIGS. 2 and 3 depict various interrelated portions of a flow chart for automatically selecting an appropriate warranty for a product, according to an embodiment. In general, warranties are classified according to a tree-based (graph) taxonomy that goes from broad categories (like furniture or electronics) to more specific categories (television, toasters, etc.) Warranty coverage duration, limitations, cost, etc. are linked to each category. A coverage linked to a category should cover all the children of said category. As discussed in further detail below, embodiments described herein generally relate to identifying an appropriate product category. A higher priority is given to more specific coverage (e.g., for a product classified as a sofa, it is preferable to select a coverage specific to sofas than a broader coverage for any furniture product). In addition to specific categories, products can be identified as "general merchandise," which typically have more expensive warranties, or "unwarrantable," which may be associated with consumable, perishable, and/or disposable (e.g., perfume, pencils, foodstuffs, etc.) and/or any goods that are otherwise are not suitable for warranty coverage (e.g., low-cost items).

FIG. 2 is a flow chart of a method of parsing a webpage, according to an embodiment. In some instances, the events of the method depicted in FIG. 2 can be performed by a user device (e.g., the user device 160 shown and described above with reference to FIG. 1.) In particular, the events of FIG. 2 can be a computer implemented method executed by a browser plug-in. Similarly stated, memory 164 (e.g., a non-transitory processor readable memory) can store instructions that, when executed by processor 162, cause processor 162 to perform the events shown in FIG. 2. The browser plug-in can be configured to operate in concert with a browser (e.g., Chrome, Safari, Edge, Firefox, etc.) and may have access to some or all data retrieved by the browser from a webserver (e.g., webserver 130).

For example, the browser plug-in can obtain, at 205, a URL associated with a webpage, requested, loading, and/or being displayed via the browser. In some instances, a list of ecommerce websites offering products suitable for extended warranties is assembled. In such an instance, when a browser loads, accesses, and/or displays a website on the list, a website scraper can execute to retrieve data from such a website, at 210, for example, based on expected layout given the URL. Such website scrapers can collect relevant data/information such as product title, product images, product URL, product description, and product price, product category (e.g., "laptops"), category path/"breadcrumbs" (e.g., "Best Buy>Computers & Tablets>Laptops>All Laptops>PC Laptops"), etc. In instances in which the website is identified from a list of known ecommerce sites, data can be scrapped, for example, based on known or expected positions or based on known or expected tags. Similarly stated, such website scrappers can recognize when a consumer lands on a PDP (or product detail page) associated with a known website format and start scraping relevant data, which can be sent back to a product classification server, at 220.

In other instances, a general purpose ML-driven website scrapers can be employed to scrape data from any suitable webpage, at 210. Similarly stated, in some instances a browser plug-in and/or web scraper can be configured to automatically detect if an arbitrary website is an ecommerce site/PDP and, if so, collect appropriate/available data from the website in response to determining that the website is a PDP, and/or to return suitable product information to the product classification server, at 220.

Website scrapers can be configured to extract a variety of product data including, for example, title, description, images, price, category etc., at 215, which, as discussed in further detail herein can be used to classify a category of product and/or eligible warranties (which can be based on price and identified product category).

FIG. 3 is a flow chart of text classification and image classification according to an embodiment. In some instances, the events of the method depicted in FIG. 3 can be performed by a product classification system (e.g., the product classification server 110) shown and described above with reference to FIG. 1.) In particular, the events of FIG. 3 can be a computer implemented method executed by a server (including, for example in a distributed architecture such as in a cloud infrastructure). Similarly stated, memory 114 (e.g., a non-transitory processor readable memory) can store instructions that, when executed by processor 112, cause processor 112 to perform the events shown in FIG. 3.

At 320, the product data scrapped from the webpage at 220 can be received. Alternatively, the product classification server may receive an indication that a user device is accessing a webpage (e.g., from the user device and/or webserver) and the product classification server may access and scrape data from the webserver. Typically, data scrapped or otherwise collected from a webpage will be received by the product classification server at 320 after a determination is made (e.g., by the user device/browser plug-in) that the webpage is a PDP. It should be understood, however, that in other embodiments, the product classification server can receive data associated with a webpage and make a determination whether a product is associated with that webpage. For example, a user device can send product classification server a URL such that the product classification server can determine whether a product is associated with that URL/webpage (e.g., using a list of known ecommerce providers, a machine learning technique, or any other suitable method). If a product is associated with the webpage, the user device and/or the product classification server can obtain additional data from the webpage (e.g., descriptive text, images, etc.)

In some embodiments, data extracted from webpages can be pre-processed, at 321 and 326. Although shown in FIG. 3 as occurring after data is received at the product classification server, it should be understood that some or all pre-processing may occur locally (e.g., by the browser plug-in and/or user device) before being sent to the product classification server. In other embodiments, it may be possible to forego pre-processing and "raw" data may be identified by data type and fed to appropriate classifiers, as discussed in more detail herein. At 326 image data can be pre-processed by one or more image processors. Image processors can, for example, exclude grayscale images, pad images with white space to give a standard aspect ratio, resize images to a standard resolution, normalize color channels (e.g., to a predefined mean and standard deviation), and/or apply any other suitable filter or transformation. Similarly, at 321, one or more text processors can be operable to pre-process web page text to, for example, remove source code (e.g., html/xml tags), shrink or exclude white space, remove and/or replace punctuation, remove stop words, tokenize text, etc.

After optional pre-processing (at user device and/or product classification server), data extracted from web pages can be provided, as an input, to one or more trained machine learning models (also referred to herein as classifiers). It can be advantageous to run different models on URLs, titles, descriptions, retailer categories (e.g., breadcrumbs), and/or images (e.g., in parallel or sequentially) as each of them may be well suited (e.g., trained and/or architecturally better suited) to identify signals from the PDP than the other(s). Using separate models has been found to identify products more accurately and/or select more appropriate warranties than a combined model run on the entire multimedia content (e.g., text, images, HTML, etc.) of a webpage and a single model run on a single data type (e.g., images, product description, etc.). Each model is trained to identify a product by category. As shown in FIG. 3, a title classifier can accept as input (optionally) pre-processed page title information, such as "Lilola Home Lucca Reversible Sectional Sofa, Couch, Storage Chaise, Pullout Sleeper, L-Shape Lounge, Steel Gray, Linen" (see, FIG. 4), and return a product classification at 341. Similarly, a description classifier can accept as input (optionally) pre-processed description information, which is typically unstructured textual data describing the product on a PDP, and return a product classification at 343. A category classifier can accept as input (optionally) pre-processed category information, such as "Best Buy>Computers & Tablets>Laptops>All Laptops>PC Laptops", and return a product classification, at 345. An image classifier can accept as input one or more (optionally) pre-processed images appearing on the PDP and return, for each image, a product classification, at 346. It should be understood that additional, fewer, and/or other combinations of classifiers can be used. For example, although not shown in FIG. 3, data associated with the PDP's URL, customer reviews, product price, hyperlinks contained within the PDP, or any other suitable data can be fed to a classifier appropriately architected and/or trained to return a classification for that data type.

Training data that is used to train the various classifiers can be collected, for example, first-hand from merchant partners, scraped from public sources, or pulled using 3rd-party product data API solutions. Training data are is representative of the data (e.g., containing product titles, descriptions, prices, images, URLs, categories/breadcrumbs, etc.) used for prediction or inference purposes, and in some instances are drawn from the same entities from which data the model(s) are configured to be applied. In other instances, training data is drawn from different entities from which the model(s) are configured to be applied. The purpose of training data is to train the models (e.g., URL models, title models, description models, retailer category (e.g., breadcrumb) models, and/or image models) to allow for future inference on unknown/unseen data from arbitrary sources. In addition or alternatively, training data can be generated using deep learning techniques such as GANs (generative adversarial networks). For instance, GANs can generate random but convincing titles, descriptions, images, etc. that may seem like real products to humans and machine learning algorithms but really are artificial and completely contrived. These GAN-generated training data can be used in unsupervised ML algorithms so that models can create intrinsic clusters to categorize data and/or GAN-generated training data can be explicitly labeled for use in supervised ML models. Experimental evidence suggests that using GAN-generated training data for supervised ML models are more effective in real-world situations than their unsupervised counterparts.

In some instances, a small DL (deep learning) model can be applied to relatively short text descriptions collected from PDPs and/or URLs. Small DL models are particularly well suited for relatively short text, which will typically include a limited number of tokens. For example, a LSTM/CNN/RNN+dense deep learning model with SoftMax for the output can be used. (LSTM refers to long short-term memory, CNN refers to convolutional neural network, and RNN refers to recurrent neural network). Larger models can be applied to relatively longer text passages. For example, after text is extracted from a PDP and/or pre-processed, a small DL (or other suitable) model can be applied to the text if it is below a length threshold (e.g., word count, number of tokens, number of unique tokens, etc.) and a larger model (including transformer or attention-based models such as BERT, GPT-2, Elmo, etc.) can be applied if it is above a length threshold.

Small DL model(s) and/or larger model(s) can thus be configured as text models (also referred to herein as text ML models, text classifiers, and/or text ML classifiers). Such text models can take (optionally) pre-processed text data and return a classification for a product appearing on a PDP. In some instances, text models can take as an input (or a portion of the input) a price appearing on the PDP. Price can therefore be used as a feature within the text models such that, for example, the text models can be more likely to classify a higher-priced product, like a dishwasher, as a large appliance and a lower priced item, such as a toaster, as a small appliance. Text models can output logits, a score between 0 and 1 that sums to 1 across the categories. That is, the text ML models are trained to classify products featured on PDPs into categories (e.g., furniture, electronics, general merchandise, small appliances, major appliances, sporting goods, unwarrantable, etc.); the models output a specific confidence value; the category with the highest value (highest confidence) corresponds to the category to which the product most likely belongs. It should be understood, however, that any suitable output measure, score, and/or indication of confidence can be calculated by the text ML models.

Large DL and transformer models can be built from the ground up, but in some instances it may be more efficient to use pre-trained transformer architectures like BERT, GPT-2, etc. that have been modified using characterized or otherwise pre-classified training data obtained, for example, from merchant sites to customize them to accurately classify data collected from PDPs to identify product categories. To be more specific, these larger DL/transformer model(s) may be particularly well suited for longer pieces of text (like product descriptions) whereas small DL model(s) may be more efficient when fed shorter pieces of text (e.g., product titles, URLS, etc.) without sacrificing much, if anything on accuracy or other performance metrics like f1 score, ROC AUC, precision, recall, etc.

Text models can be trained, for example, using grid search and cross-validation for the different parameters (dropout, layer sizes, pool size, activation function, layer-specific parameters (e.g., the kernel size of a CNN layer), data type-specific parameters (e.g., maximum length of titles, maximum number of words to use in the "vocabulary," etc.). Grid search produces an output of an optimal, customized, and/or satisfactory hyperparameter set for a particular trained model. What hyperparameters are available to train on is usually based on the architecture of the ML model, and by iterating over many different combinations of various parameters, the hyperparameter set with the best validation and/or cross-validation score (or (cross-) validation score above a threshold, local maximum score, etc.) is a suitable hyperparameter set for the customized model. Cross-validation is a standard technique that allows a trained model setup to be tested without holding back too much data for validation purposes (and hence losing data for training) to get a better idea of true performance. During cross-validation, multiple training sessions can be initialized on different test/train sets; the results can be averaged to give a final output performance metric. Examples of hyperparameters include "dropout %" and "layer size"; dropout % refers to a parameter instructing the model to randomly drop x % of the parameters (or set them to zero) at the time of training to help prevent overfitting (when the model is so perfectly fitted to the training data that it fails to generalize to real-world cases); and layer size refers to the number of nodes in a deep learning model's layers (there are many layers in a model). The exact source and structure of training data will vary based on the architecture of the model. The training data will typically also include unwarrantable and general merchandise such that the model can identify PDPs containing general merchandise and/or unwarrantable products based on the text contained on the page. In addition, or alternatively, data collected from web scrapers discussed above can be used to (re)train text models, for example, in categories with less representation or subpar performance/accuracy.

A CNN or other suitable ML model can be applied to image data extracted from PDPs. Such image models (also referred to herein as image ML models, image classifiers, and/or image ML classifiers) can take (optionally) pre-processed image data extracted from PDPs and return a classification, typically in the form of logits, for the product appearing on the PDP. According to an embodiment, a Deep Residual CNN (ResNet-18) ML model that has been pre-trained to provide a starting point for model optimization can be used as the image model. The final fully connected linear layer of the image model can be replaced with the appropriate architecture for PDP image data. For instance, because the standard ResNet-18 model consists of 1000 final classes, it can be desirable to replace this final fully connected layer with a layer that has an output equal to the number of categories that the training data covers. Retraining this model allows for the weights in the original model as well as the final adjusted layer to be tuned specifically to the underlying training data, but in an efficient manner to produce a customized model that benefits from a model pre-trained on image data and therefore having its model weights close enough to what would be the "optimal" weights, but tweaked enough that it now performs well on insurance or risk-based categories that the standard model would be incapable of identifying or that the standard model would have unacceptable performance identifying. Dropout can be used to avoid overfitting. In some instances, smaller, customized architectures can be used, for example, to decrease latency with consistent performance. Such smaller, customized architectures may be used when, for example, a merchant's PDPs have a known image format, the merchant offers a known category of products, or it is known or suspected that the content of the images on the PDP are otherwise constrained. Image models can output logits or any other suitable score and/or indication of confidence In some embodiments, images extracted from PDPs known or suspected of having less-well defined categories of products, (e.g., general merchandise, unwarrantable products) are not analyzed by image models. This may, for example, reduce the misidentification or classification of the offered item. There are a few ways to put this into practice. For instance, running the text classifiers in advance of running the image classifiers can give the likelihood of each category from the text models, and if the likelihood is that a PDP features a product in a poorly defined category, the images from that PDP may not be fed to an image model, which can reduce system latency. In such an instance, overall classification can be primarily based on the output of text-based models. Alternatively, the image model can be run in parallel with the text (and/or other) model(s); if the parallel-executing models return low confidence classifications across a number of categories (e.g., with none of the categories like furniture, electronics, etc. meeting a minimum confidence threshold), it may be assumed that the product belongs to a broad or ill-defined category such as "general merchandise." Ultimately, the combination ML classifier (described later) is trained on these edge cases, and it learns on both well-defined and ill-defined categories so it gains an understanding of what final category the product should be assigned to (based on the strengths and weaknesses of individual classifiers across the different categories, agnostic of what category, well-defined or ill-defined, that they may belong to).

In an example, the image model can be pretrained on 1000 ImageNet classes. The training data can be collected from a variety of merchants using techniques like those discussed above with reference to website scrapping. Alternatively, classified images, of types of warrantable goods can be collected from any other suitable source, such as image searches, commercial databases, etc. In some instances, less specific categories (General Merchandise, unwarrantable) are excluded from image training data since images of products in such categories may be less likely to share similar features between images. Using such categories in training data may force the model to learn the random noise in the dataset and hurt generalization (and may cause overfitting). Image models can be trained using stochastic gradient descent with validation and test hold-out sets. In instances in which image models are not trained to identify less specific categories, images can be classed as General Merchandise, unwarrantable, or unclassifiable, if the image is classified with low confidence (e.g., the largest logit is below a threshold value, the difference between the largest logit and the next-largest logit is below a threshold value, the largest logit is less than a threshold number of standard deviations of the distribution of the logits from 0.5, etc.).

Outputs of the title classifier, description classifier, category classifier, and/or any other suitable models can be combined to provide greater accuracy than any individual model and/or the sum of the individual classifiers. In some instances, outputs of individual data-type classifiers can be post-processed, at 350, before being provided as input to a combination ML classifier at 360. For example, if multiple images (e.g., and multiple image model outputs) exist for a product, a voting system can be used based on the outputs from each image. For example, if two images on a PDP are identified as "furniture" and third is identified as "automotive," the "automotive" image can be discarded (e.g., not used as an input to a combination ML classifier, discussed below). Other suitable post-processing operations are also possible, for example logits produced for each image can be averaged together on a per-category basis, or a median calculated. As another example, the class associated with the largest number of images can be determined. In addition or as an alternative to a voting system, in some implementations a relevance of an image to the product associated with the PDP can be assessed, at a pre-processing step, as part of the image classification, and/or as a post-processing step. For example, many PDPs contain extraneous images or images only loosely related to the featured product, such as logos, stock photography, excerpts from user manuals, advertising scenes in which the product plays only a small role, etc. In some instances, a machine learning task or other suitable technique can be operable to produce a score (or other suitable measure) of each image's relevance to a product of the PDP. Images with a relevance score below a threshold can be discarded before, after, or during the application of an image classifier. Alternatively, in some instances all images may be classified by an image classifier and a combination ML classifier can be trained such that less relevant images do not produce misclassifications.

Similarly, in some instances before being provided to the combination ML classifier, output from text classifiers (e.g., title classifier, description classifier, category classifier, etc.) can be post-processed at 350, for example through a weighted voting process (or other suitable operation, such as mean, median, max, etc.) that discards outlier outputs. In other instances, the "raw" output of text and/or image classifiers can be fed directly to the combination ML classifier. For example, the output predictions for multiple images produced by the image classifier at 346 can be provided as inputs directly to the combination ML classifier.

A combination ML classifier can take, as an input, the output confidences (logits) of the various feature-specific models and output a logit for each category. The combination ML classifier can be, for example, a Logistic Regression or Tree based model such as Random Forest, XGBoost (extreme gradient boosting), etc., a DL model, or any other suitable ML model. Tree-based models are frequently particularly well suited for analyzing the outputs of previous ML models. In some instances, additional data can be provided as input to the combination ML classifier. For example, in some instances price data, URL data, 5-star-style review information etc. may be provided to the combination classifier.

The combination ML classifier can also be trained using grid search and cross-validation for the different parameters (similar to the training techniques describe above). The parameters are likely to vary between tree-based and linear models, like logistic regression, and training the combination ML classifier homes in on the parameters that provide the best, customized, suitable, and/or acceptable results (e.g., classification accuracy above a threshold value) on the test/holdout data. The combination ML classifier is configured to take the work the prior classifiers (e.g., text models, image models, etc.) have done and put it together in a final solution. In that sense the combination ML classifier can function as an orchestrator, learning that the output of certain prior classifiers that the ML classifier takes as inputs are more accurate in certain categories than others (for instance, certain image classifiers might excel in furniture and electronics categories so they are weighted more or trusted more by this final combination/strategy classifier; however, mattress and mattress protector images might fool the image classifiers and the text classifier(s) might be more accurate at identifying products in such categories).

Misclassification by the combination ML classifier can result in inappropriate warranties being selected, which can increase cost to the customer, the warrantor, or possibly both. Accordingly, the combination ML classifier can be configured to output a measure of confidence of its prediction. In some instances, a warranty may be offered only if the measure of confidence exceeds a threshold. In addition to classifying products into various specific known product classes (e.g., electronics, furniture, jewelry) the combination ML classifier can classify products classified with low confidence (e.g., the largest logit is below a threshold value, the difference between the largest logit and the next-largest logit is below a threshold value, the largest logit is less than a threshold number of standard deviations of the distribution of the logits from 0.5, etc.) into broad ranging "General Merchandise" and/or "unknown" catch-ails. The combination ML classifier can also include an "unwarrantable" classification. In some instances, General Merchandise-class warranties can be selected for a product (e.g., only) when the confidence for "unwarrantable" is also low (e.g., below a threshold value). In some embodiments, the price of a selected plan can be adjusted based on the risk of misclassification. For example, when a particular category is identified with low confidence, the price of the offered warranty can be increased.

Once a PDP is classified, a price can be selected for the warranty offered for the product featured on that PDP. Pricing can be determined based on category, item price, the retailer offering the product, or any other suitable factor. In some instances, a range of warranties (e.g., with different duration, coverages, etc.) may be identified. Once selected, the warranty offer can be presented to the customer via a frame or pop-up generated by a browser plug-in. In this way, the warranty offer can be made without involving the merchants sales flow or requiring access (or even permission to accesses) to the merchant's sales-related APIs or other infrastructure.

Figure 4:
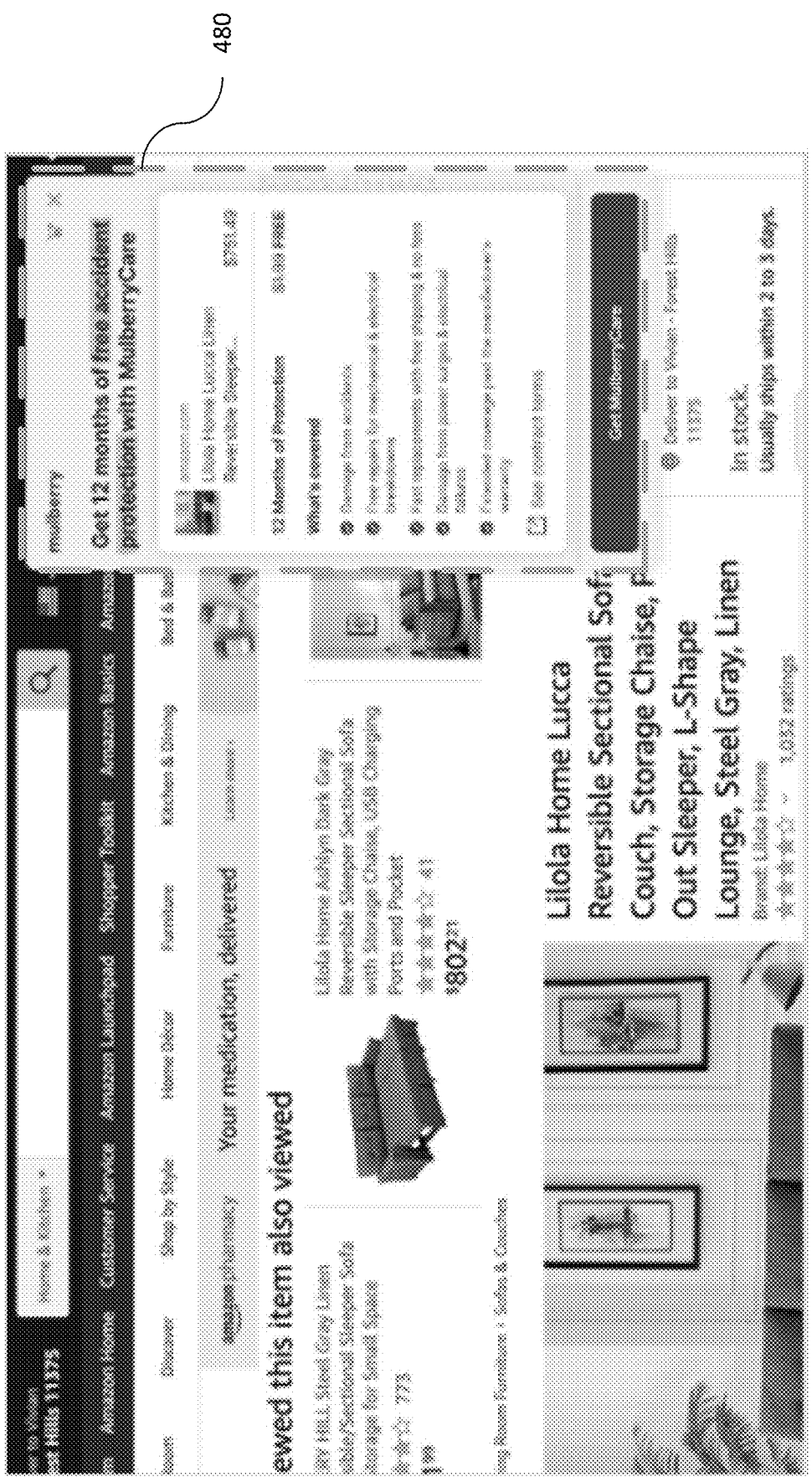
FIGS. 4 and 5 depict composite websites in a desktop environment, according to two embodiments.
Figure 5:
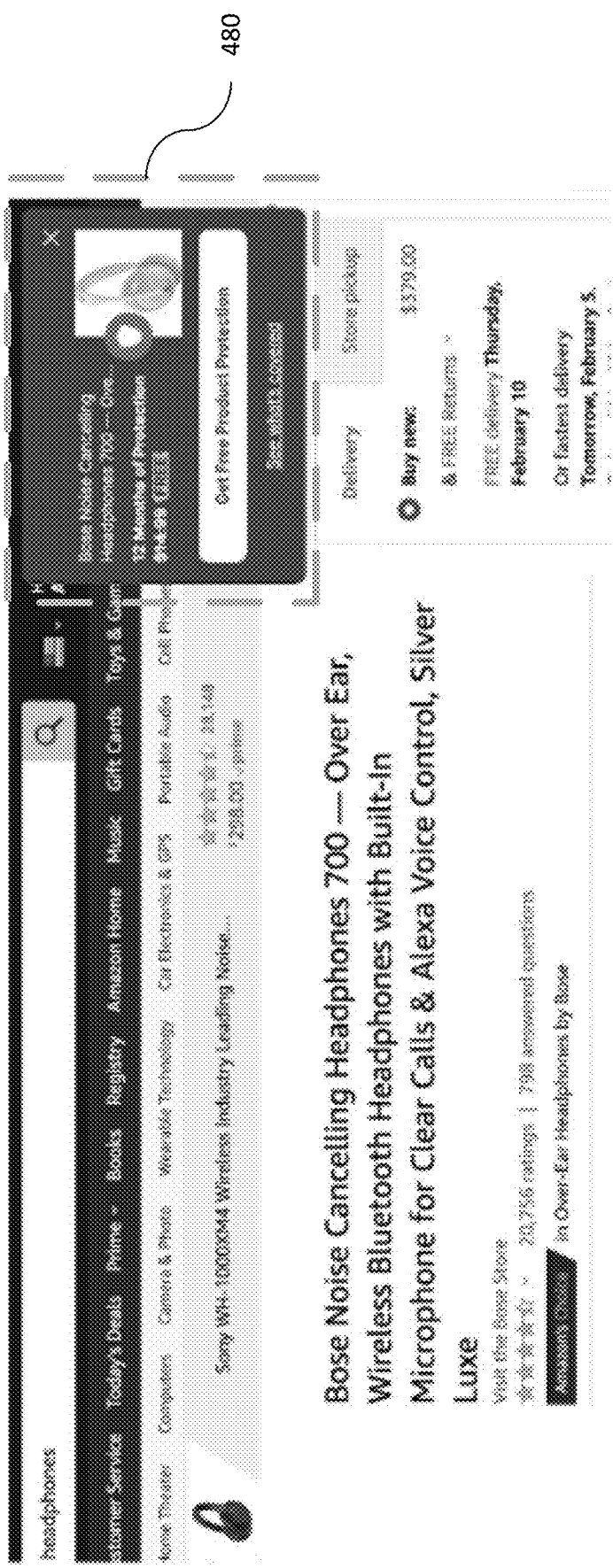
Figure 6:
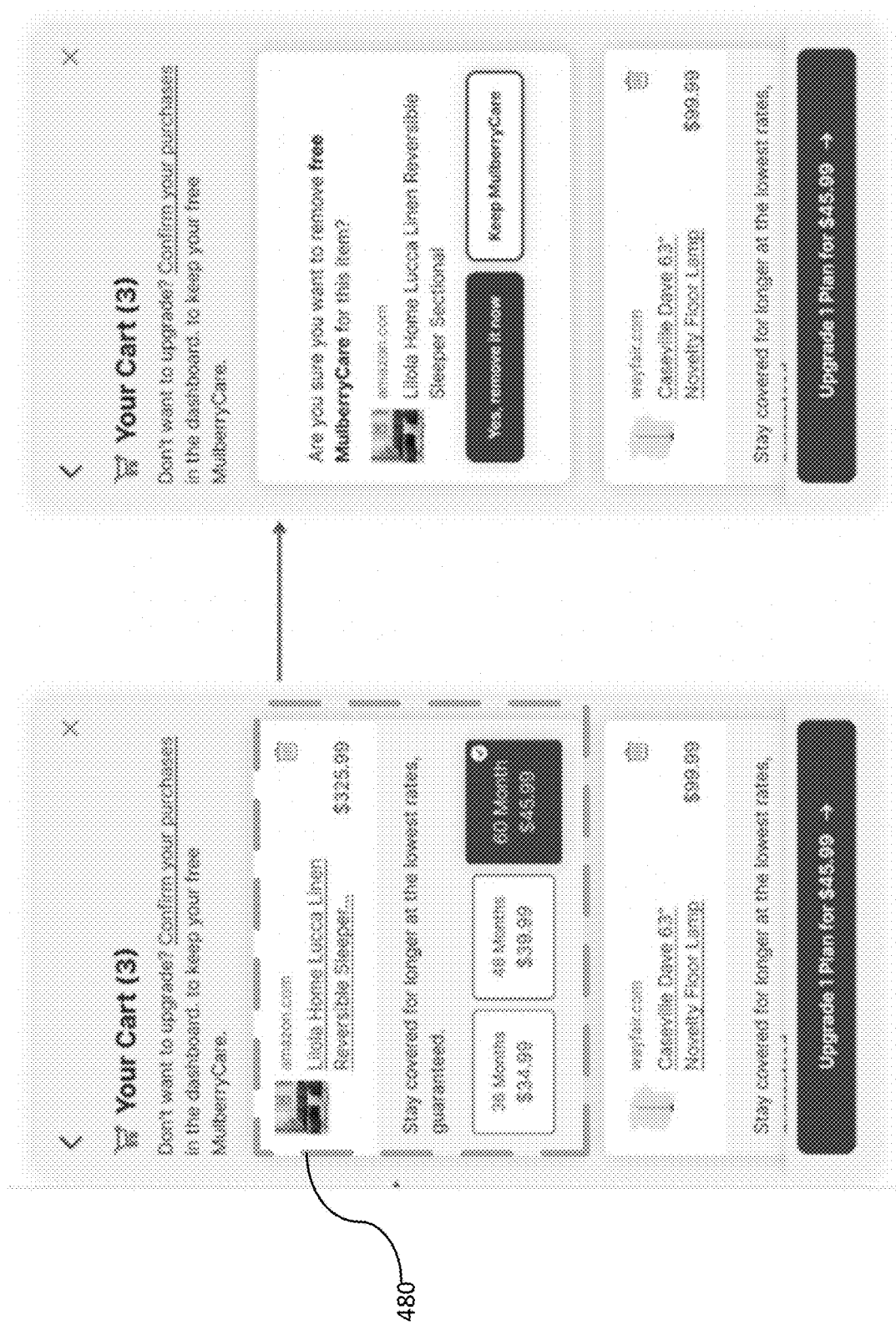
FIG. 6 depicts a composite website in a mobile environment, according to an embodiment.

Returning to FIG. 2, a user device can receive a warranty offer at 270 and can present a composite webpage at 280 that includes at least a portion of the PDP and the warranty offer, such that a user viewing the composite webpage can purchase the product from the merchant hosting the PDP and a warranty from a (typically different) entity associated with the product classification server. The composite webpage can combine features of the website hosted by the webserver (e.g., associated with the product) and features associated with the warranty offer hosted by or associated with the product classification server. FIGS. 4 and 5 depict composite websites in a desktop environment, according to two embodiments. FIG. 6 depicts a composite website in a mobile environment, according to an embodiment. Such composite websites represent an improvement over traditional techniques for offering third-party warranties or other add-ons to an ecommerce transaction, which typically involved interrupting or augmenting the merchant's sales flow and/or redirecting a user to a dedicated webpage associated with the warranty/add-on provider before or after completing the base transaction. Such interruptions and redirections are not ideal, because directing a user away from a purchase page or requiring the user to process a transaction through a separate interface reduce conversation/purchase completion rates. In addition or alternatively, "inline" offers can be made, in which the offer maintains the look and feel of the PDP.

According to some embodiments, a browser plug-in can receive signals (e.g., associated with a warranty offer) from the product classification server (or associated server) and generate a composite website without requiring integration with or cooperation of merchants on the server end. This solves the technical problem existing add-on providers face in integrating add-on offers to a variety of merchants, not all of whom may provide suitable API access or be willing to partner with an add-on provider. For example, as shown in FIGS. 4-6, an integrated warranty offer 480 appears as an iframe that allows the purchase of a warranty from a separate entity (i.e., different from the merchant offering the product) without redirecting the user/browser away from the PDP.

Where methods and/or events described above indicate certain events and/or procedures occurring in a certain order, the ordering of certain events and/or procedures may be modified. Additionally, certain events and/or procedures may be performed concurrently in a parallel process, when possible, as well as performed sequentially as described above.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. For example, while embodiments described herein typically discuss identifying a product category to select and offer an appropriate warranty, those skilled in the art would readily understand that categorizing a product/webpage can have many different uses. For example, an output of a combination ML classifier (e.g., at 360 as shown and described with reference to FIG. 3) can be used to recommend similar products, offer comparison or competitor products, automated order tracking aggregation, labeling products by category in ecommerce stores, offer other add-on products or services, such as delivery, gift wrapping, recycling, upgrade paths, maintenance/service plans, credit offers, subscription services, and/or the like.

More generally, those skilled in the art will readily appreciate that all parameters and configurations described herein are meant to be exemplary and that the actual parameters and/or configurations will depend upon the specific application or applications for which the inventive teachings is/are used. Those skilled in the art will recognize or be able to ascertain using no more than routine experimentation, many equivalents to the specific inventive embodiments described herein. It is, therefore, to be understood that the foregoing embodiments are presented by way of example only and that, within the scope of the appended claims and equivalents thereto; inventive embodiments may be practiced otherwise than as specifically described and claimed.

What is claimed is:

1. A non-transitory processor-readable medium storing code comprising instructions configured to be executed by a processor to cause the processor to:
   retrain at least one pretrained image classifier, including:
      accessing training data collected from a plurality of webpages, the training data including a plurality of images,
      ascertaining a number of product classes represented in the training data,
      replacing a final layer of the at least one pre-trained image classifier with a layer that is configured to classify an image into one of a number of classes that is equal to the number of product classes represented in the training data to produce at least one modified image classifier, and
      train the at least one modified image classifier with the training data to produce the at least one trained machine learning image classifier;
   receive an indication of text content and an indication of a plurality of images appearing on a webpage offering a product for sale;
   apply a trained machine learning text classifier to the text content to produce a text classification of the product;
   apply the at least one trained machine learning image classifier to each image from the plurality of images to return a plurality of predicted image classes;
   subject the plurality of predicted image classes to a voting filter such that an image class from the plurality of predicted image classes that is associated with fewer than a threshold number of images from the plurality of images is discarded and not provided to a trained combination machine learning classifier;

apply the trained combination machine learning classifier to the text classification and the plurality of predicted image classes, excluding the image class that is associated with fewer than a threshold number of images from the plurality of images, to predict a combined classification of the product; and offer a warranty for the product based on the combined classification of the product.

2. The non-transitory processor-readable medium of claim 1, wherein the code is a web browser plug in configured to be executed by a processor with the web browser.

3. The non-transitory processor-readable medium of claim 1, the code further comprising instructions to cause the processor to determine that the webpage is offering the product for sale, the indication of text content and the indication of the plurality of images received in response to determining that the webpage is offering the product for sale.

4. The non-transitory processor-readable medium of claim 1, the code further comprising code to cause the processor to receive an indication that the user has accessed the webpage from a user device, the indication of text content and the indication of the plurality of images received in response to receiving the indication that the user device has accessed the webpage.

5. The non-transitory processor-readable medium of claim 1, the code further comprising code to cause the processor to receive, from a server hosting the webpage, an indication that a user device has accessed the webpage, the indication of text content and the indication of the plurality of images received in response to receiving the indication that the user device has accessed the webpage.

6. The non-transitory processor-readable medium of claim 1, wherein the trained combination machine learning classifier is configured to produce a confidence score that the combined classification applies to the product, the the warranty offered based on the confidence score exceeding a threshold.

7. The non-transitory processor-readable medium of claim 1, the code further comprising instructions to cause the processor to pre-process the text content before applying the trained machine learning text classifier.

8. The non-transitory processor-readable medium of claim 1, wherein the plurality of webpages is associated with a merchant offering the product.

9. The non-transitory processor-readable medium of claim 1, wherein the plurality of webpages is associated with a plurality of merchants.

10. The non-transitory processor-readable medium of claim 1, wherein the combined classification is different from at least one of the predicted text class or the predicted text class.

11. The non-transitory processor-readable medium of claim 1, wherein:

the trained machine learning text classifier is configured to produce a plurality of logits, the text classification being associated with a largest logit from the plurality of logits; and the trained combination machine learning classifier is applied to the plurality of logits.

12. A non-transitory processor-readable medium storing code representing instructions configured to be executed by a processor to cause the processor to:

retrain a pretrained image classifier, including:

accessing training data collected from a plurality of webpages, the training data including a plurality of images, ascertaining a number of product classes represented in the training data, replacing a final layer of the pre-trained image classifier with a layer that is configured to classify an image into one of a number of classes that is equal to the number of product classes represented in the training data to produce a modified image classifier, and train the modified image classifier with the training data to produce the trained machine learning image classifier;

receive an indication of text content and an indication of image content appearing on a webpage offering a product for sale;

identify a plurality of types of text content from the indication of text content;

apply at least one trained machine learning text classifier from a plurality of trained machine learning text classifiers to each type of text content from the plurality of types of text content to output a plurality of predicted text product classes;

subject the plurality of predicted text product classes to a voting filter such that a predicted text product class from the plurality of predicted text product classes that is associated with fewer than a threshold number of types of text content from the plurality of types of text content is discarded and not provided to a trained combination machine learning classifier;

apply the trained machine learning image classifier to the image content to produce an image classification;

apply a trained combination machine learning classifier to the image classification and the plurality of predicted text product classes, excluding the predicted text product class that is associated with fewer than a threshold number of types of text, to predict a combined classification of the product; and offer a warranty for the product based on the combined classification of the product.

13. The non-transitory processor-readable medium of claim 12, wherein:

the indication of image content includes indications of a plurality of images;

the code to cause the processor to apply the trained machine learning image classifier includes code to cause the processor to apply at least one trained machine learning image classifier to each image from the plurality of images, the at least one trained machine learning image classifier configured to predict, for each image from the plurality of images, an image class from a plurality of image classes; and the image classification is at least one of an average or a median of the plurality of image classes.

14. The non-transitory processor-readable medium of claim 12, wherein:

the indication of image content includes indications of a plurality of images;

the code to cause the processor to apply the trained machine learning image classifier includes code to cause the processor to apply at least one trained machine learning image classifier to each image from the plurality of images, the at least one trained machine learning image classifier configured to predict, for each image from the plurality of images, an image class from a plurality of image classes; and the image classification is a most frequently appearing classification in the plurality of image classes.

15. The non-transitory processor-readable medium of claim 12, wherein:

the indication of image content includes indications of a plurality of images; and the code to cause the processor to apply the trained machine learning image classifier includes code to cause the processor to apply at least one trained machine learning image classifier to each image from the plurality of images to predict, for each image from the plurality of images, an image class from a plurality of image classes, the code further comprising code to cause the processor to:

subject the plurality of image classes to a weighted voting filter configured to select the image classification from the plurality of image classes based on a number of instances of the image classification being applied to the plurality of images and a confidence of each instance of the second classification being applied to the plurality of images.

* * * * *